United States Patent [19]

Redlich

[11] Patent Number: 4,667,158

[45] Date of Patent: May 19, 1987

[54] LINEAR POSITION TRANSDUCER AND SIGNAL PROCESSOR

[76] Inventor: Robert W. Redlich, 9 Grand Park Blvd., Athens, Ohio 45701

[21] Appl. No.: 718,635

[22] Filed: Apr. 1, 1985

[51] Int. Cl.[4] .............................................. G01B 7/14
[52] U.S. Cl. .................................. 324/207; 324/234; 340/870.36; 336/130
[58] Field of Search ............... 324/206, 207, 208, 234, 324/236; 336/45, 84 R, 84 C, 84 M, 130; 340/870.36

[56] References Cited

U.S. PATENT DOCUMENTS

| | | | |
|---|---|---|---|
| 4,008,457 | 2/1977 | Radcliffe, Jr. | 336/130 X |
| 4,063,206 | 12/1977 | Walker, III | 336/45 |
| 4,134,065 | 7/1979 | Bauer et al. | 324/208 |
| 4,156,221 | 5/1979 | Graul | 336/84 C X |
| 4,282,485 | 8/1981 | Pauwels et al. | 336/45 X |

Primary Examiner—Reinhard J. Eisenzopf
Assistant Examiner—Robert W. Mueller
Attorney, Agent, or Firm—Frank H. Foster

[57] ABSTRACT

Disclosed are a transducer for converting linear motion of a core into a proportional change in inductance by means of skin effect, and bridge processing circuitry for stable conversion of changing inductance into a proportional voltage.

15 Claims, 9 Drawing Figures

LINEAR POSITION TRANSDUCER AND SIGNAL PROCESSOR

BACKGROUND OF THE INVENTION

This invention relates to measurement of straight line motion by generation of a voltage proportional to distance moved. At present, measurement similar to that accomplished by the invention is commonly performed by a Linear Variable Differential Transformer or LVDT (U.S. Pat. Nos. 2,408,524, 2,459,210, 2,461,238) and, less commonly, by magnetic devices using a variable reluctance principle (U.S. Pat. Nos. 4,121,185, 4,339,953). Practical disadvantages of the LVDT are; (a) relatively low bandwidth, that is, the proportionality of voltage to distance moved becomes insufficiently accurate for many purposes when the motion is oscillatory and above a relatively low frequency, (b) temperature sensitivity, that is, the proportionality factor relating voltage and linear movement is significantly affected by changing temperature, (c) relatively large size, since the LVDT must be longer than the required range of motion to be measured, by a factor of approximately two, (d) fragility, since the LVDT embodies three coils of fine wire which is subject to breakage under vibration or shock, and (e) relatively complex installation requiring connection to each of three internal coils. Variable reluctance devices suffer from (a) relatively poor linearity, that is, the output voltage generated is not accurately proportional to distance moved, (b) large size, and (c) temperature sensitivity. The object of the present invention is to provide a linear motion transducer and signal processor free of the above noted disadvantages, in a simple, compact embodiment suitable for such applications as robotics, automated machine tools, x-y plotters, mechanical engineering research and development, and process control.

SUMMARY OF THE INVENTION

The invention comprises an inductor (the "transducer"), made variable as the result of skin effect in a movable metal core, connected electrically to a form of bridge circuit (the "signal processor") whose output is a voltage proportional to distance moved by the core from a centered position. The transducer is a helical coil of wire of uniform pitch, wound on an insulating cylindrical tube into which is inserted a movable, close fitting metallic tube (the "core") of material having high electrical conductivity but low magnetic permeability, e.g., aluminum or copper. A source of AC voltage in the range 50–200 khz. excites the bridge circuit, one branch of which is the transducer coil. Because of the well known skin effect, magnetic fields in the core are confined to a thin surface layer of thickness essentially equal to the skin depth in the core material. In the invention, skin depth is substantially less than core radius, so that most of the magnetic flux that would exist in the absence of the core is expelled by the core. Therefore, axial motion of the core changes the inductance of the transducer coil and unbalances the bridge. With the core partially inserted, the axial length of the transducer coil can be divided into the region occupied by the core, where magnetic flux is low and essentially unchanging with axial location, and the region unoccupied by the core, where magnetic flux is relatively high compared to the core region and essentially unchanging with axial location except for a transition region near the end of the core and of axial extent approximately equal to the core diameter. Provided that the transition region does not overlap the end of the coil, the inductance of the coil is an accurate linear function of the axial position of the core. Therefore measurement of core position can be accomplished by measuring the inductance of the coil (L). In the bridge circuit of the invention, the transducer coil is driven by an alternating current source, consequently L is measured by the alternating voltage across the transducer coil terminals. In practice, it is advantageous to have a bipolar output voltage that is zero when the core is at a nominal center position where it is inserted approximately halfway into the coil, and which varies linearly with distance moved by the core away from the center position. This is accomplished by the bridge circuit of the invention in a manner which is insensitive to changes in amplitude and frequency of the exciting source, and insensitive to temperature changes.

The excitation frequency ("carrier frequency" of $f_c$) is higher than that usable by conventional LVDTs by a typical factor of about 15. High $f_c$ is necessary to the invention so that the skin depth in the core will be small and the core will thus be effective in expelling magnetic flux. However, high $f_c$ has an important practical benefit relating to measurement of oscillatory motion. When the core oscillates at frequency f, the carrier voltage across the transducer coil is amplitude modulated at frequency f. The desired output signal is the modulation envelope, which can be approximately recovered by well known methods of amplitude demodulation, followed by low pass filtering to reject carrier while retaining the envelope. One effect of demodulation and filtering is a residual carrier signal in the filtered output, which represents undesired noise having the effect of limiting measurement resolution. Another undesirable effect is phase shift between the recovered modulation envelope and core motion, which represents a measurement error. It can be shown that, for a low pass filter having n stages, the quantity (phase shift × residual carrier) is proportional to $(f/f_c)^n$. Therefore, the higher the value of $f_c$, the smaller is the product of two undesirable quantities. In the invention, this product is lower than that attainable by LVDT systems having comparable filtering, by a factor of typically 15.

For precise measurement of linear motion, the "scale factor" of the transducer, that is, the ratio of change in output voltage to change in core insertion, must be insensitive to temperature changes. In this respect, the invention is improved relative to LVDT measuring systems by a typical factor of 5. This point is further discussed under "Detailed Description of the Invention", where simple means for achieving temperature insensitivity are described.

Another requirement for precise measurement of linear motion is exact proportionality of output voltage to core movement ("linearity"). The invention, despite its simple construction, is inherently linear over most of its axial length, in contrast to LVDTs, which achieve linearity over about half their axial length by means of carefully tapered winding densities. Simple means for extending the linear range of the transducer invention relative to its axial length are described under "Detailed Description of the Invention".

A position transducer using skin effect in a movable sleeve to achieve a variable inductance is disclosed in U.S. Pat. No. 4,395,711 but has important practical disadvantages that are corrected in the present invention. The basic embodiment shown in FIG. 1 of U.S. Pat. No. 4,395,711 is unshielded, consequently the return path for magnetic flux is the space surrounding the transducer, and the inductance of the device will be undesirably affected by surrounding objects. Further, lack of shielding permits stray magnetic fields to undesirably influence the voltage at the terminals of the transducer. Part no. 30 of FIG. 1, U.S. Pat. No. 4,395,711 is a ferrite cylinder that is supported at one end only and is therefore subject to breakage under shock or vibration, particularly when the ratio of transducer length to diameter is high. Coil 18 of FIG. 1, U.S. Pat. No. 4,395,711 is illustrated as having appreciable radial dimension, which is undesirable since it can be shown that the linear range of the transducer is increased when the radial dimension of the winding is small compared to skin depth in the winding material. FIG. 3 of U.S. Pat. No. 4,395,711 shows a moving, partially shielded ferrite core which has disadvantageously high inertia and would be subject to fracture during rapidly oscillating motion. Coil 18 of U.S. Pat. No. 4,395,711 is wound directly on a plastic bobbin, consequently the inductance of the device is significantly affected by the relatively high thermal expansion of the bobbin material.

Elements of the present transducer invention that distinquish it from, and improve its performance relative to, the device disclosed in U.S. Pat. No. 4,395,711, are:

(a) A basically improved configuration which permits absence of ferrite in a simple embodiment, and, in an improved embodiment, the use of stationary ferrite supported rigidly over its entire surface, (b) shielding to define the magnetic circuit and exclude stray fields, (c) a single layer coil of wire having diameter less than the skin depth in the wire material, to extend linear range, (d) means for eliminating the effect of bobbin expansion on scale factor, (e) means for extending the linear range of the transducer relative to its length.

DETAILED DESCRIPTION OF THE INVENTION

Figure 1:
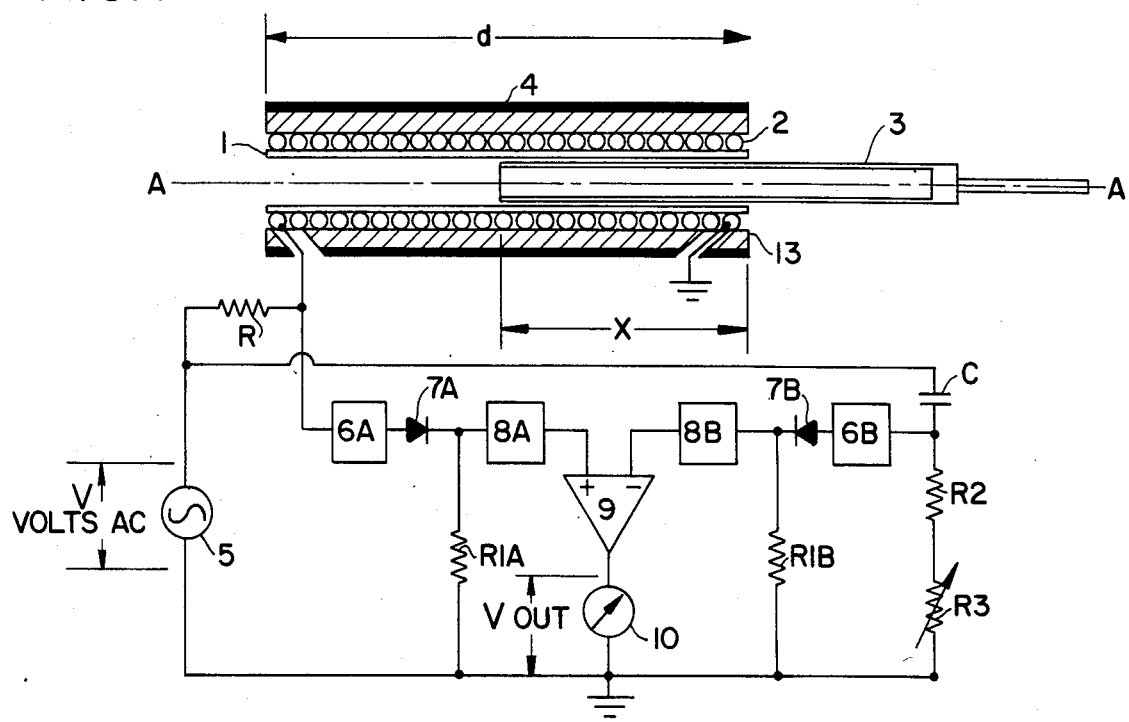
FIG. 1 shows an axial cross-sectional view of a basic transducer embodiment according to the invention, and a block diagram of a preferred embodiment of the bridge circuitry used to process the transducer signal.

With reference to FIG. 1; 1,2,3, and 4 comprise a basic transducer according to the invention. A—A is an axis of cylindrical symmetry common to 1,2,3, and 4, and d is the length of the transducer. 1 is a bobbin in the form of a thin walled tube of electrically insulating material having suitable properties for a dry bearing, e.g., one of many types of commercially available plastic. 2 is a helical coil of wire, preferably copper, wound on the surface of bobbin 1, in a single layer and with constant spacing between adjacent turns of wire. 3 is a cylindrical rod or tube, movable along A—A, made of a good electrical conductor having low magnetic permeability, e.g., copper or aluminum. X represents the depth of insertion of 3 into 2. If 3 is tubular, its wall thickness must be at least twice the skin depth in the tube material at the carrier frequency $f_c$, which typically requires a wall thickness of at least 0.5 millimeter. 3A is a rod by means of which 3 is attached to the object whose motion is to be measured. 4 is a shield tube which confines magnetic flux generated by current in 2 to the interior of the transducer, and shields 2 from stray fields. For effective shielding over a wide frequency range, 4 is preferably made of material having both high electrical conductivity and high magnetic permeability, such as soft iron or low carbon steel.

Figure 1A:
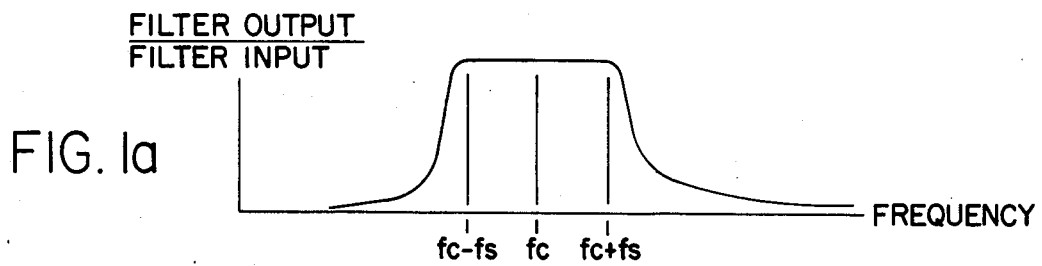
FIGS. 1a and 1b illustrate the output to input relationship of respective filters in the bridge circuitry as a function of frequency.
Figure 1B:
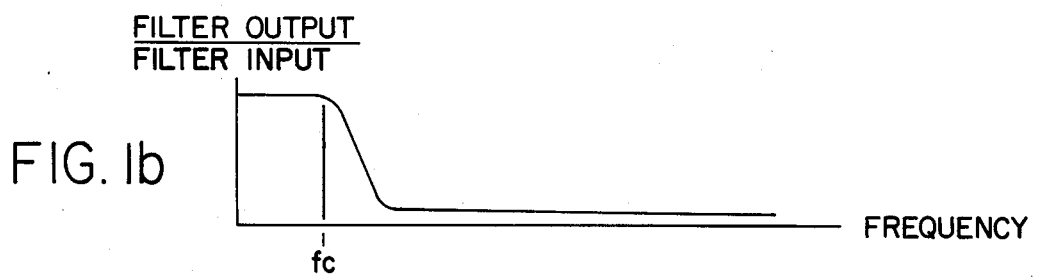
Figure 1C:
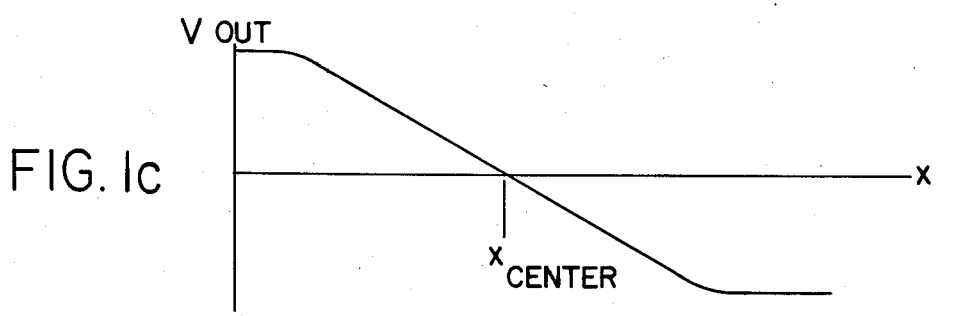
FIG. 1c illustrates graphically the output voltage of the signal processor as a function of core position.

5 is a source of alternating voltage V at a frequency preferably in the range 50-200 khz. (carrier frequency $f_c$). 5 drives coil 2, which has an inductance that will be denoted here by L, through resistor R. The resistance R is much greater than the inductive reactance of L, so that for practical purposes L is driven by a current source, and the voltage across 2 is very nearly $(V/R) \times (2\pi f_c L)$. A functionally equivalent substitute for R is an electronically controlled current source 14, generating a current proportional to V, as illustrated by FIG. 1e. However, L decreases linearly with x, since skin effect confines magnetic flux to a layer typically 0.25 mm thick on the outer surface of 3, thus reducing the magnetic flux through 2 in the region occupied by 3. Therefore, the alternating voltage amplitude across 2 is very nearly a linear function of x. In the processing circuitry, the alternating voltage across 2 is first applied to a bandpass filter 6A having the transfer characteristic shown in FIG. 1a. In FIG. 1a, $f_s$ denotes the highest motion frequency for which the system will provide accurate measurements. $f_s$ is determined from considerations presented later in this section. Since oscillating motion results in amplitude modulation of the alternating voltage across 2, the processing circuit must handle frequencies in the range $(f_c - f_s)$ to $f_c + f_s$. Filter 6A passes signals in this range without significant amplitude or phase distortion, but cuts off elsewhere to minimize spurious noise effects. Demodulation of the signal across 2 is accomplished in this embodiment by a half wave rectifier comprising diode 7A and resistor R1A, and low pass filter 8A, which has the transfer characteristic illustrated by FIG. 1b, and whose purpose is to recover the modulation envelope while rejecting carrier and carrier harmonics generated by rectification. If low pass filter 8A has n lowpass sections, each with cutoff frequency $f_s$, it can be shown that residual carrier is proportional to $(f_s)^n$. Thus there is a tradeoff between signal handling bandwidth as specified by $f_s$, and resolution, which is determined by residual carrier. In practice, $f_s = f_c/5$ is a reasonable signal bandwidth since it yields resolution approximately equal to transducer linearity.

The output of low pass filter 8A is applied to one input of a differential amplifier, whose output $V_{out}$ drives an indicator, which can be a chart recorder, an oscilloscope, or, for slowly varying x, a digital or analog voltmeter. The other input to differential amplifier 9 is derived from the output of circuitry identical to that used to process the transducer signal; specifically, bandpass filter 6B (identical to 6A), rectifier 7B and R1B (identical to rectifier 7A and R1A), and low pass filter 8B (identical to 8A). However, the input to 6B is the voltage across the series combination of fixed resistor $R_2$ and adjustable resistor $R_3$, which combination is in series with capacitor C, whose reactance is much higher than $(R_2+R_3)$ so that, for practical purposes, the input voltage to 6B is $V \times (R_2+R_3) \times (2\pi f_c C)$. Variable resistor $R_3$ is adjusted so that when core 3 is at its nominal center position $x_c$, resulting in coil 2 having inductance value $L_c$, the following holds:

$$C \times (R_2+R_3) = L_c/R$$

Figure 1D:
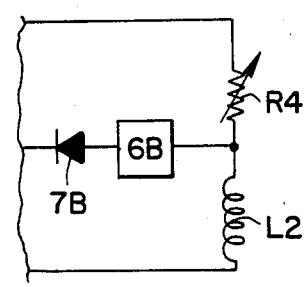
FIGS. 1d and 1e show alternative embodiments of parts of the bridge circuitry.
Figure 1E:
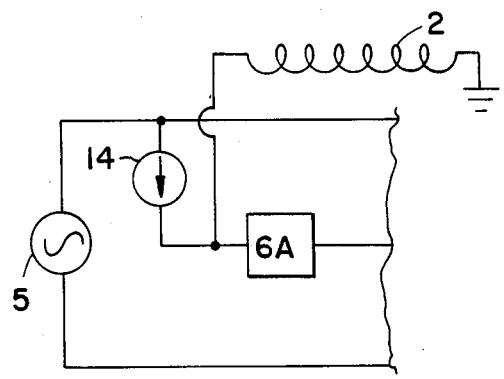

With $R_3$ so adjusted, $V_{out}$ is zero when core 3 is at $x_c$, independently of source voltage V and source frequency $f_c$, and the relationship between $V_{out}$ and x is as illustrated in FIG. 1d.

An alternative to the combination C, $R_2$, and $R_3$ is shown in FIG. 1d. $R_4$ is much greater than the reactance of $L_2$, hence the voltage across $L_2$ is, for practical purposes, $(V/R_4) \times (2 L_2 f_c)$. In this embodiment, $R_4$ is adjusted so that when core 3 is at $x_c$, $R_4 = R \times (L_2/L_c)$. With $R_4$ so adjusted, $V_{out}$ is zero when core 3 is at $x_c$, independently of V and $f_c$.

Because the transducer signal and the balancing signal generated by either the combination $R_2$, $R_3$, C or the combination $L_2$, $R_4$ are processed by physically identical circuits, temperature effects on the circuit cancel and $V_{out}$ is zero when $x = x_c$, independently of circuit temperature.

Figure 2A:
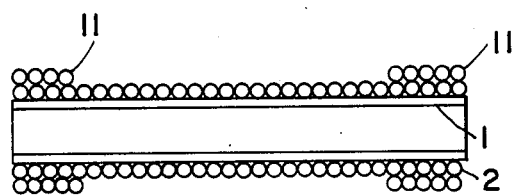
FIGS. 2a and 2b show means of extending the linear range of the transducer relative to its length.
Figure 2B:
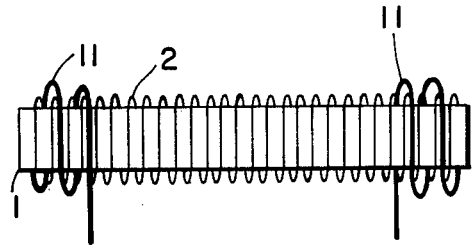

As x approaches d, the length of the transducer, the rate of change of output voltage with x decreases and becomes zero when $x = d$. It can be shown theoretically, and confirmed by experiment, that the undesirable decrease in $dV_{out}/dx$ can be confined to a smaller axial extent, and the linear range of the transducer thereby increased, by adding additional turns of wire to coil 2, the additional turns being located at the end of 2 opposite to that from which core 3 enters bobbin 1. 11 in FIGS. 2a and 2b identifies the additional turns, which, as shown in FIG. 2b, are wound in the same sense (clockwise or counter-clockwise, as coil 2, and form a second layer surrounding coil 2. The number of additional turns can be determined from the formula;

number of turns of 11 = ((turns on 2)/d) × (bobbin radius), however, substantial improvement in linear range can be achieved even if the number of turns of 11 deviates considerably from the value given by the formula.

Figure 3:
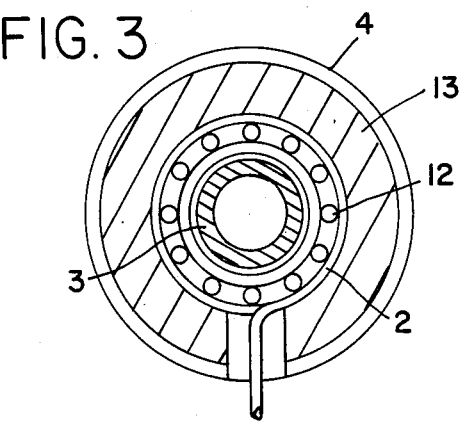
FIG. 3 is a radial cross-sectional view of a transducer embodying two improvements over the basic transducer; a first improvement to reduce temperature sensitivity and a second improvement to reduce overall diameter and further reduce temperature sensitivity.

If coil 2 is tightly wound on bobbin 1, it expands with 1 as temperature increases, which has the effect of reducing the scale factor $dV_{out}/dx$ of the transducer-processor system. The reduction per degree of temperature is relatively large, since plastic materials suitable for 1 have a high coefficient of thermal expansion. An improvement that can reduce the effect of bobbin expansion by a factor of about 5 is shown in FIG. 3, and consists of separating coil 2 from bobbin 1 by means of a number of axial strips or rods of material having a low coefficient of expansion relative to the bobbin material. Part 12 of FIG. 3 illustrates circular rods separating 1 and 2, spaced equally around the circumference of 1. If the separators 12 are electrical conductors, they must be insulated from 2 and from each other.

Generally, any decrease in the magnetic reluctance of the annular space between coil 2 and shield tube 4 will increase the scale factor $dV_{out}/dx$ and reduce the effects of temperature and circuit drift when these are normalized to the total change in $V_{out}$ over the linear range of the transducer. In FIG. 3, 13 is ferrite material having high magnetic permeability but low electrical conductivity, installed in the space between coil 2 and shield 4 and having the effect of reducing the reluctance of this space to a low value. Although FIG. 3 shows ferrite 13 completely filling the space between 2 and 4, improvement will be realized even if 13 only partially fills the space between 2 and 4. In a practical embodiment, ferrite 13 is preferably a ferrite powder distributed within a hardened bonding agent.

I claim:

1. A linear position measurement apparatus including a transducer comprising:
   (a) a tube of electrically insulating material having a length at least substantially four times its outside diameter;
   (b) a helical, conducting coil wound around the tube and at least substantially four of said diameters long;
   (c) an elongated core of electrically conducting, non-ferromagnetic material matingly received within and slidable in axial reciprocation within the tube; and
   (d) a non-conductive, ferromagnetic, tubular layer surrounding the coil and at least substantially four of said diameters long, said layer having substantially uniform radial dimensions along its length.

2. A transducer in accordance with claim 1 wherein a tubular, electrically conductive shield surrounds said layer.

3. A transducer in accordance with claim 2 wherein the shield is constructed of a ferromagnetic conductor.

4. A transducer in accordance with claim 2 wherein the inside diameter of the shield is greater than the outside diameter of the coil and wherein said nonconductive, ferromagnetic layer comprises a ferrite powder distributed within a hardened resin bonding agent and filling the space between the coil and the shield.

5. A transducer in accordance with claim 2 wherein the coil conductor has a skin depth dependent upon frequency and the radial thickness of the coil is not greater than substantially the skin depth of the coil conductor at a selected operating frequency.

6. A transducer in accordance with claim 2 wherein the coil is substantially a single layer of windings having a uniform conductor spacing along its length.

7. A transducer in accordance with claim 6 wherein each end of the coil has a second layer of extra turns formed by continuing the windings at each end in the same turn direction but doubling longitudinally back over the first layer of turns a distance not exceeding substantially one coil radius.

8. A transducer in accordance with claim 7 wherein said second layer extends back one-half a coil radius.

9. A linear position measurement apparatus in accordance with claim 1 which further includes a driving and detecting circuit comprising:
   (a) an alternating electrical energy source having a selected, nominal operating frequency;
   (b) a bridge circuit comprising, (i) a first branch having two series legs and an intermediate node, the first branch connected parallel to the source, one of the legs of the first branch being said coil and the other leg being an effective high resistance at least substantially twice the maximum inductive reactance across said coil at the operating frequency;

(ii) a second branch having two series legs and an intermediate node, the second branch also connected parallel to the source, the leg of the second branch which is opposite and not connected to the coil leg of the first branch comprising a capacitive reactance and the other leg of the second branch being a resistance, said capacitive reactance being at least twice as great as the resistance of said other leg of said second branch;

(c) a pair of detector means each connected to a different one of said nodes for detecting at their outputs a signal from each node which is proportional to the amplitude of the signal at each of said nodes; and (d) differential circuit means connected to the outputs of said detector means for detecting a balance signal which is proportional to the difference between the amplitude of the alternating signal at each of said nodes.

10. A transducer in accordance with claim 9, wherein a display is connected to the output of said differential circuit means for displaying the amplitude of the balance signal.

11. A transducer in accordance with claim 10, wherein the ratio of the inductive reactance at said coil to the resistance of the first branch is equal to the ratio of the resistance of the second branch to the capacitive reactance at a selected reference position of the core at said operating frequency.

12. A transducer in accordance with claim 11, wherein said reference position is substantially with the end of the core at the center of the coil.

13. A linear position measurement apparatus in accordance with claim 1 which further includes a driving and detecting circuit comprising:

(a) an alternating electrical energy source having a nominal operating frequency;

(b) a bridge circuit comprising, (i) a first branch having two series legs and an intermediate node, the first branch connected parallel to the source, one of the legs of the first branch being said coil and the other leg being an effective high resistance at least substantially twice the maximum inductive reactance across said coil at the operating frequency;

(ii) a second branch having two series legs and an intermediate node, the second branch also connected parallel to the source, the leg of the second branch which is opposite and not connected to the coil leg of the first branch comprising a resistance and the other leg of the second branch comprising an inductor having an inductive reactance no greater than one-half the resistance of the other leg of the second branch;

(c) a pair of detector means each connected to a different one of said nodes for detecting at their outputs a signal from each node which is proportional to the amplitude of the signal at each of said nodes; and (d) differential circuit means connected to the outputs of said detector means for detecting a balance signal which is proportional to the difference between the amplitude of the alternating signal at each of said nodes.

14. A linear position measurement apparatus in accordance with claim 1 which further includes a driving and detecting circuit comprising:

(a) an alternating electrical energy source having a nominal operating frequency;

(b) a bridge circuit comprising, (i) a first branch having two series legs and an intermediate node, the first branch connected parallel to the source, one of the legs of the first branch being said coil and the other leg being an electronically controlled current source connected to said alternating energy source for providing a current through said coil which is proportional to the voltage of said energy source;

(ii) a second branch having two series legs and an intermediate node, the second branch also connected parallel to the source, the leg of the second branch which is opposite and not connected to the coil leg of the first branch comprising a capacitive reactance and the other leg of the second branch being a resistance, said capacitive reactance being at least twice as great as the resistance of said other leg of said second branch at the operating frequency;

(c) a pair of detector means each connected to a different one of said nodes for detecting at their outputs a signal from each node which is proportional to the amplitude of the signal at each of said nodes; and (d) differential circuit means connected to the outputs of said detector means for detecting a balance signal which is proportional to the difference between the amplitude of the alternating signal at each of said nodes.

15. A linear position measurement apparatus comprising:

(a) a tube of electrically insulating material having a length at least substantially four times its outside diameter;

(b) a helical conductor coil having a skin depth dependent upon frequency and wound around the tube and at least substantially four of said diameters long, said coil being substantially a single layer of windings having a uniform conductor spacing along its length and a radial thickness not greater than substantially the skin depth of the coil conductor at a selected operating frequency;

(c) an elongated core of electrically conducting, non-ferromagnetic material matingly received within and slidable in axial reciprocation within the tube;

(d) a non-conductive, ferromagnetic, tubular layer surrounding the coil and at least substantially four of said diameters long, said layer having substantially uniform radial dimensions along its length; and (e) a tubular, electrically conductive, ferromagnetic shield surrounding said ferromagnetic layer along essentially the entire length of the coil.

* * * * *